(12) United States Patent
Olson

(10) Patent No.: US 11,118,686 B2
(45) Date of Patent: Sep. 14, 2021

(54) IRRIGATION BOOT ASSEMBLY

(71) Applicant: Valmont Industries, Inc., Omaha, NE (US)

(72) Inventor: Andrew T. Olson, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 459 days.

(21) Appl. No.: 16/043,093

(22) Filed: Jul. 23, 2018

(65) Prior Publication Data

US 2019/0040981 A1 Feb. 7, 2019

Related U.S. Application Data

(60) Provisional application No. 62/539,731, filed on Aug. 1, 2017.

(51) Int. Cl.
*F16J 15/52* (2006.01)
*F16L 51/02* (2006.01)
*F16L 27/11* (2006.01)

(52) U.S. Cl.
CPC .............. *F16J 15/52* (2013.01); *F16L 27/11* (2013.01); *F16L 51/02* (2013.01)

(58) Field of Classification Search
CPC .......... F16J 15/52; F16L 27/11; F16L 27/111; F16L 51/02; F16L 51/025; F16L 51/027; F16L 51/03
USPC ...................................... 285/145.5, 226, 227
See application file for complete search history.

(56) References Cited

U.S. PATENT DOCUMENTS

| 1,345,971 | A | * | 7/1920 | Star ................................ 285/226 |
| 2,414,997 | A | | 1/1947 | Atkins |
| 2,652,282 | A | | 9/1953 | Willetts |
| 2,879,787 | A | | 3/1959 | Ingram |
| 3,087,745 | A | * | 4/1963 | Rumbell ................ F16L 27/111 285/226 |
| 3,135,295 | A | * | 6/1964 | Ziebold ................. F16L 51/027 285/226 |
| 3,295,548 | A | | 1/1967 | Woods |
| 3,626,988 | A | * | 12/1971 | Chu ....................... F16L 51/027 |
| 3,777,979 | A | | 12/1973 | Ririe et al. |
| 4,041,975 | A | | 8/1977 | Ames |
| 4,059,293 | A | * | 11/1977 | Sipler ...................... F16L 27/11 |
| 4,406,482 | A | * | 9/1983 | Clebant ......................... 285/226 |
| 4,415,185 | A | | 11/1983 | Vinciguerra et al. |
| 5,397,157 | A | | 3/1995 | Hempel et al. |
| 5,957,383 | A | | 9/1999 | Benest |
| 6,027,039 | A | | 2/2000 | Mercil |

(Continued)

*Primary Examiner* — Zachary T Dragicevich
(74) *Attorney, Agent, or Firm* — Milligan PC LLO

(57) ABSTRACT

The present invention provides an irrigation boot assembly for securing span pipes. According to a preferred embodiment, an irrigation boot assembly of the present invention may preferably include a center body portion formed as a laterally extending, hollow tube having a first side opening and a second side opening for receiving and securing connected span pipes. According to a further preferred embodiment, the irrigation boot assembly of the present invention preferably further includes securing straps extending around the first and second side openings. According to a further preferred embodiment, the center body portion of the present invention preferably further includes a plurality of bellows which each include a ridge portion extending above the surface of the center body portion.

14 Claims, 8 Drawing Sheets

(56) References Cited

U.S. PATENT DOCUMENTS

| | | | |
|---|---|---|---|
| 6,109,535 A | 8/2000 | Korus | |
| 6,398,266 B1 * | 6/2002 | Crump | 285/226 |
| 6,902,351 B1 | 6/2005 | McGee et al. | |
| 7,073,735 B2 | 7/2006 | Wubben et al. | |
| 7,309,035 B2 | 12/2007 | Korus | |
| 7,364,096 B1 | 4/2008 | Sosnowski et al. | |
| 7,384,008 B1 | 6/2008 | Malsam | |
| 8,689,837 B1 * | 4/2014 | Smith | 285/226 |
| 8,864,048 B1 | 10/2014 | Light | |
| 8,882,006 B2 | 11/2014 | Korus et al. | |
| 8,899,496 B2 | 12/2014 | Wissler et al. | |
| 2007/0046021 A1 | 3/2007 | Crawford | |
| 2016/0368011 A1 | 12/2016 | Feldhaus et al. | |

\* cited by examiner

IRRIGATION BOOT ASSEMBLY

RELATED APPLICATIONS

The present invention claims priority to U.S. Provisional Application No. 62/539,731 filed Aug. 1, 2017.

BACKGROUND AND FIELD OF THE PRESENT INVENTION

Field of the Present Invention

The present invention relates to an irrigation boot assembly for securing span pipes.

Background of the Invention

Straight walled flex boots are used across the mechanized irrigation industry to make water tight connections between span pipes and other pipe joints. An example of a straight walled flex boot 10 is shown in FIG. 1. As shown, these boots 12 are generally constructed of heavy, multiple ply rubber material (such as 4 ply EPDM with polyester yarn or the like) and wrapped around two adjoining sections of pipe 14, 16 to handle high forces due to pressure and movement in the span or pipe joint.

Commonly, the boots 12 are secured to the outside of the span pipes via large flex boot clamps 18. Extra clamps, longer boots, and even tabbed boots 19 (as shown in FIG. 1) are used to prevent the boot from slipping off in rough terrain through many cycles. However, despite the extra supports and tabs used, the present designs for boots on irrigation systems are unable to provide consistent, long-term support for connecting span pipes. Instead, the flex boots of the prior art are prone to slippage and tears after repeated use.

In order to overcome the limitations of the prior art, the present invention provides a span boot with a reinforced, bellow design which overcomes the many problems that have been observed over the years with straight walled span boots.

SUMMARY OF THE PRESENT INVENTION

The present invention discloses an irrigation boot assembly for securing span pipes. According to a preferred embodiment, an irrigation boot assembly of the present invention may preferably include a center body portion formed as a laterally extending, hollow tube having a first side opening and a second side opening for receiving and securing connected span pipes. According to a further preferred embodiment, the irrigation boot assembly of the present invention preferably further includes securing straps extending around the first and second side openings. According to a further preferred embodiment, the center body portion of the present invention preferably further includes a plurality of bellows which each include a ridge portion extending above the surface of the center body portion. According to a further preferred embodiment, the bellows of the present invention may preferably be formed to compress and extend in response to lateral and angular forces applied due to the misalignment of the first and second span pipes. According to a further preferred embodiment, the center body portion of the present invention may preferably further include a plurality of valleys which are positioned between each of the plurality of bellows and which may include reinforcing bands within each valley.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
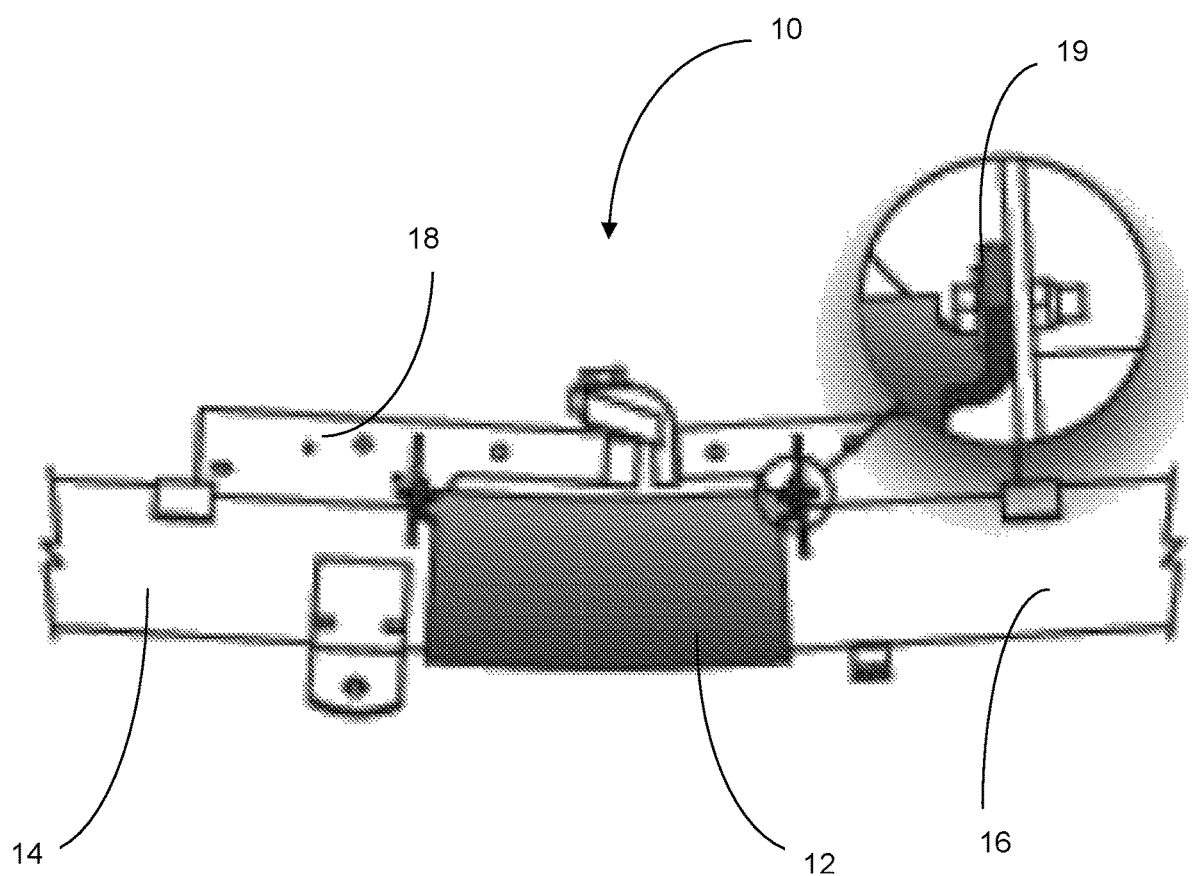
FIG. 1 shows a straight walled flex boot of the prior art.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The main features and preferences of the present invention and preferred embodiments of same have been described in general. As can be appreciated, any number of variations of these features may be implemented on other embodiments of the present invention. Further modifications may also be made which do not necessarily alter the fundamental characteristics of the invention. It is considered that such variants and modified embodiments still fall within the scope of the present invention which, in its preferred form, includes an enhanced flex boot with bellows.

Referring now to FIGS. 2-8, an exemplary vehicle embodying aspects of the present invention shall now be discussed. It should be understood in this discussion that each aspect of the disclosed invention may be used individually or in combination with a variety of other features without departing from the scope and spirit of the present invention.

Figure 2:
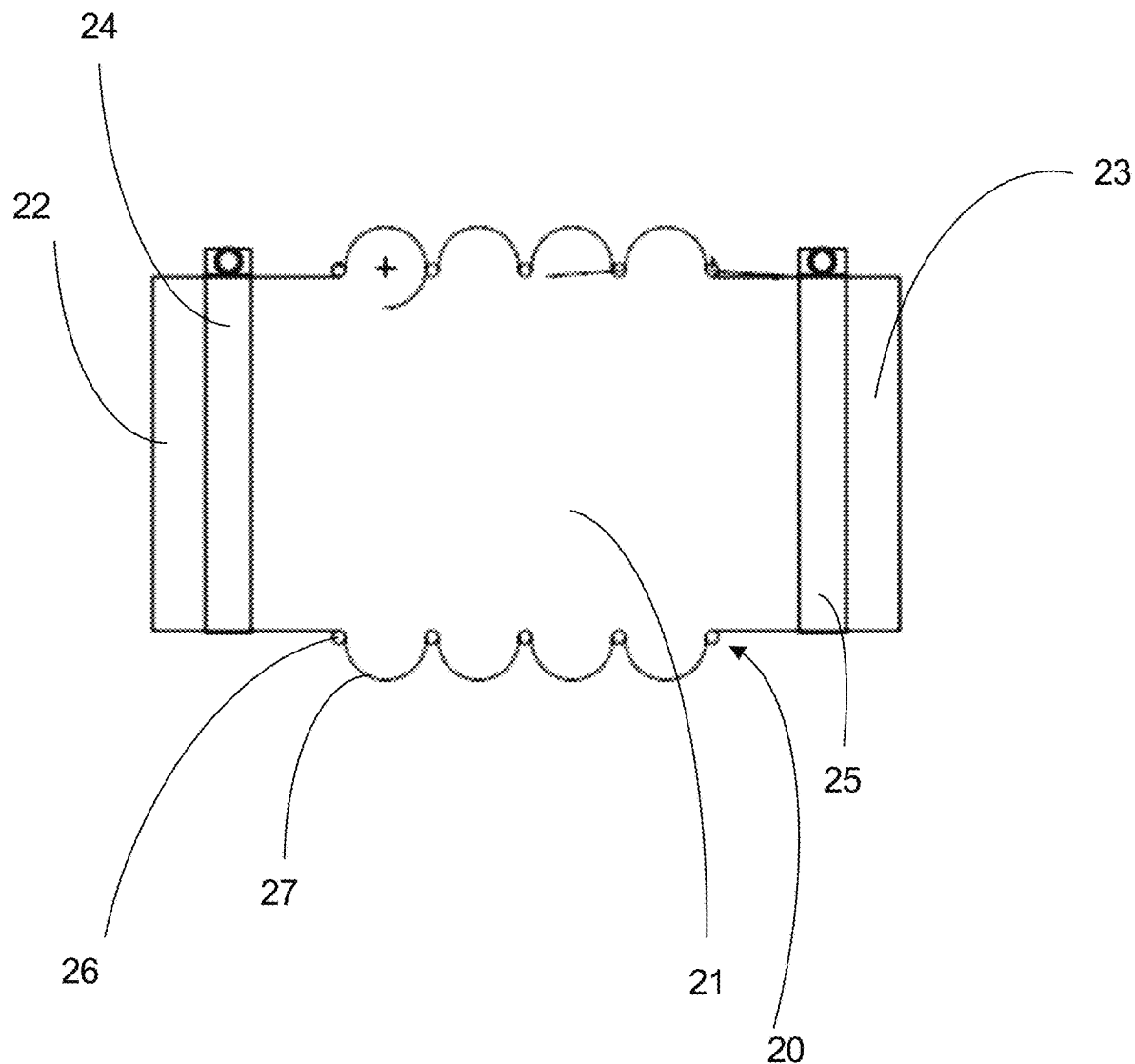
FIG. 2 shows an exemplary flex boot in accordance with a first preferred embodiment of the present invention.

Referring now to FIG. 2, a first exemplary flex boot 20 in accordance with a first preferred embodiment of the present invention shall now be discussed. As shown in FIG. 2, the exemplary flex boot 20 may preferably include a center body portion 21 which is preferably formed as a laterally extending, hollow tube. As further shown, the center body portion 21 preferably has a diameter greater than that of span pipes 22 and 23. In this way, span pipes 22 and 23 may be inserted into the center body portion 21 and secured via securing straps/clamps 24, 25 respectively. As further shown, the center body portion 21 preferably further includes a plurality of ridged bellows 27 which are preferably formed to compress and extend in response to lateral and angular forces applied due to the misalignment of the span pipes 22, 23. According to a further preferred embodiment, the valleys of the bellows may be reinforced by reinforcing bands 25, 26 which may be formed of metal, plastic or fabric rings/bands secured within each valley. According to a further preferred embodiment, the exemplary flex boot 20 of the present invention may include a center body portion 21 having four bellows extending around the circumference of the center body portion 21. According to a further preferred embodiment, the bellows may together extend for an approximate length of 7 inches. According to a still further preferred embodiment, the bellows may preferably be formed as generally semicircular ridges extending above and wrapping around the center body portion 21. According to a further preferred embodiment, the semicircular ridges may have an outer circumference of 2.47 inches. Alternatively, it should be understood that the number of bellows may be varied as needed (such as from 2-25 bellows) and that the bellows may together extend over any distance as needed (such as from 1-15 inches). Further, it should be understood that the outer circumference of each bellow may be varied as needed (such as from 0.5-5.0 inches).

According to preferred embodiments, the bellows of the present invention may preferably be incorporated into the wall(s) of the center body portion to form concertinaed sides to allow the center body portion to expand and contract and thus absorb any movement, especially axial elongation between irrigation pipes. Structurally, each bellow may be formed to include a ridge extending around the surface of the center body portion with lower height regions ("valleys") located between each bellow ridge. According to alternative preferred embodiments, the bellows may be v-shaped or circular shaped as discussed further below. As also discussed further below, the irrigation boot of the present invention may preferably further include support rings/bands to support the valleys of the bellows when under pressure.

Figure 3:
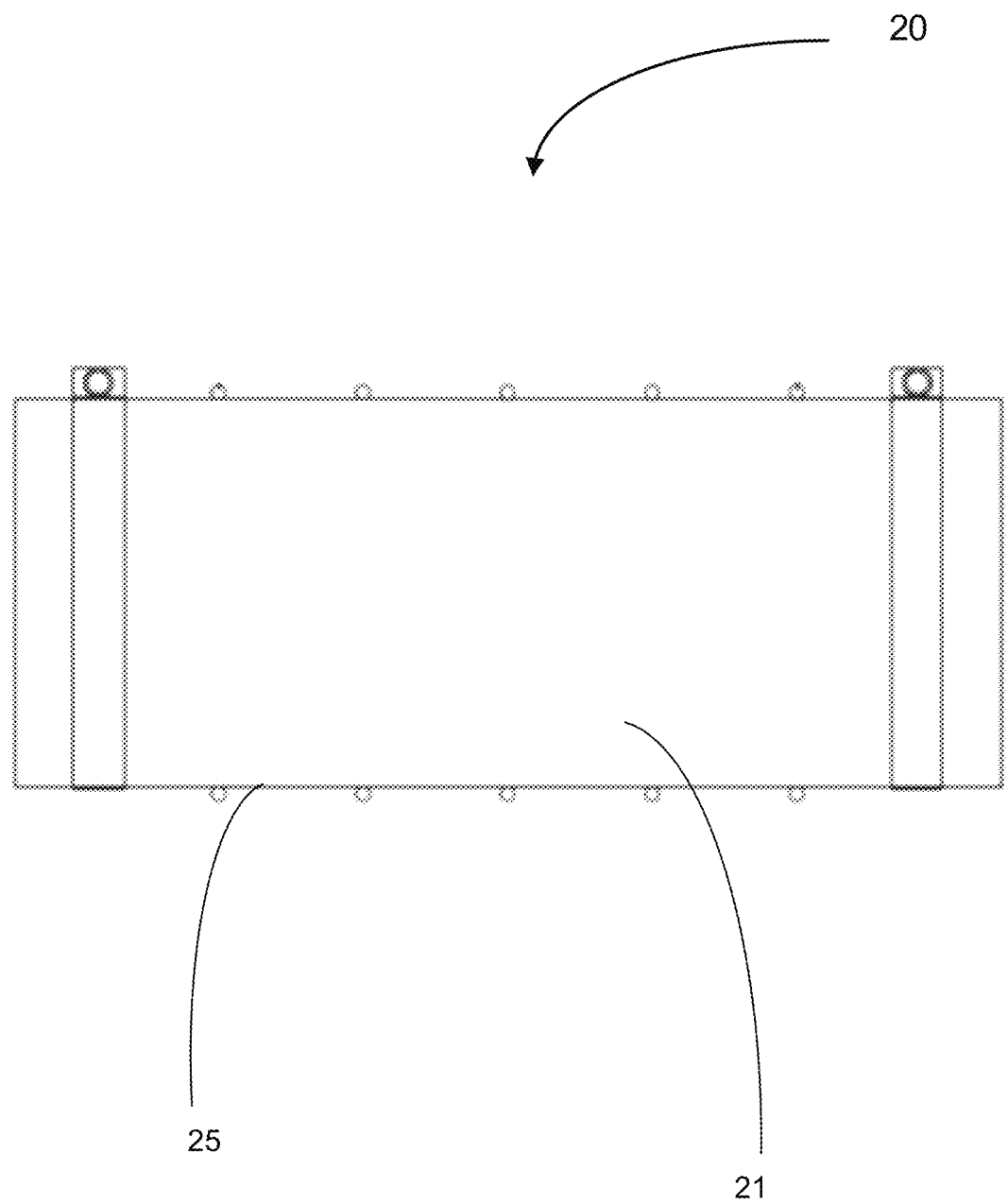
FIG. 3 shows the exemplary flex boot of FIG. 2 with bellows in a laterally extended position.

With reference now to FIG. 3, the exemplary flex boot 20 of FIG. 2 is shown with the bellows 25 in a laterally extended position. As shown in FIG. 3, in accordance with a further preferred embodiment, the lateral extension of the bellows 25 may preferably allow the lateral length of the bellows 25 to increase from an overall lateral length of 7 inches (as discussed above) to an overall lateral length of 9.9 inches or greater. Alternatively, it should be understood that the number and size of the bellows may be varied to allow for variations in the extended length as needed (i.e. such as allowing extensions in the range of 1-20 inches).

Figure 4:
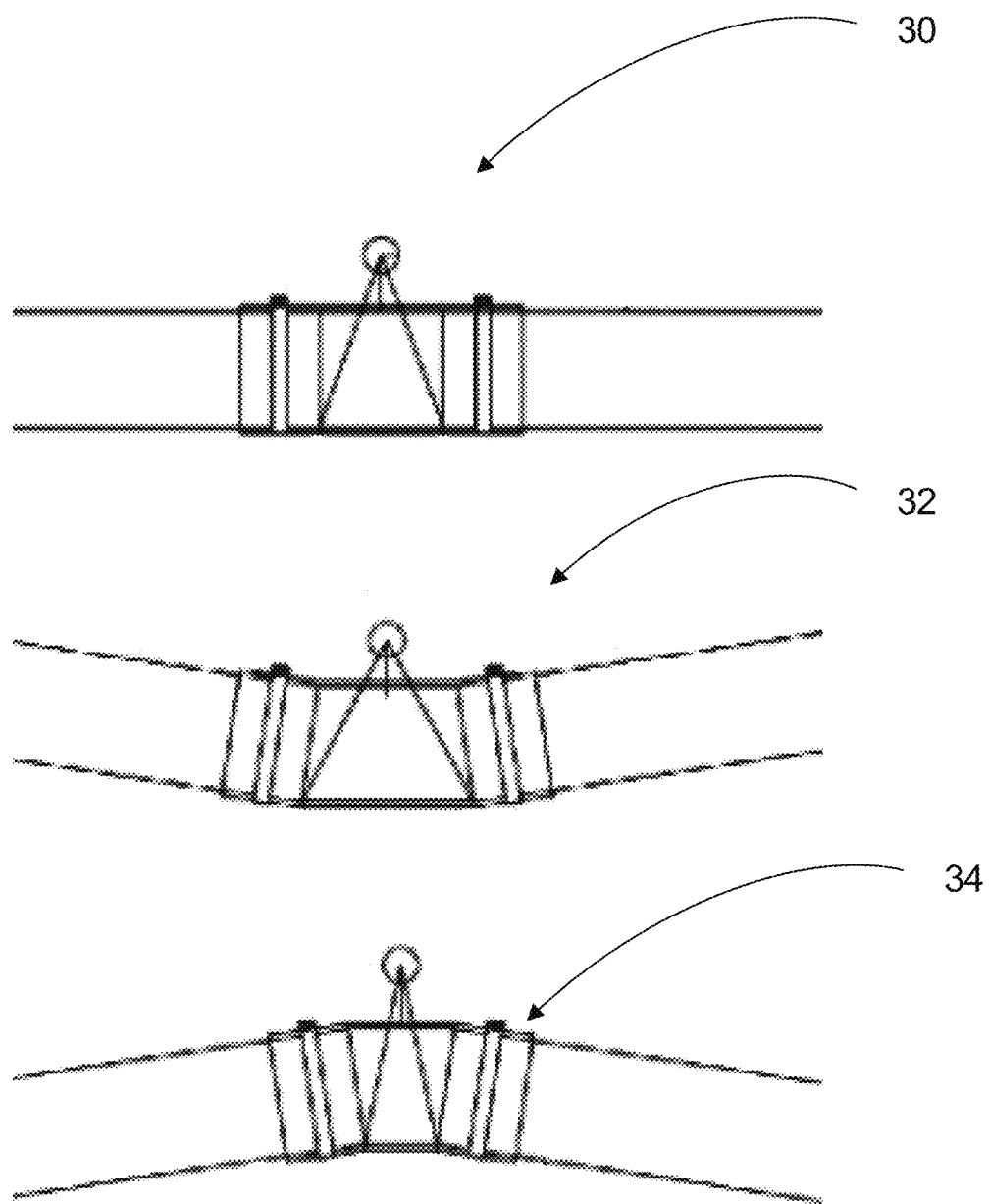
FIG. 4 shows overhead views of the exemplary flex boot of FIG. 2 while being flexed.

Referring now to FIG. 4, overhead views of the exemplary flex boot of FIG. 2 being flexed are provided to illustrate the movement and limits for exemplary 6⅝" spans. The views of FIG. 4 illustrate that as an irrigation machine incorporating the present invention moves over terrain, the span joints experience what is referred to as slope absorption. When this occurs, the primary actions of the boot assembly of the present invention will either be elongation with positive slope absorption or contraction in the case of negative slope absorption. Further, the boot assembly of the present invention may preferably further allow twisting in combination with elongation or contraction. In this way, the exemplary flex boot of the present invention may include interconnected sections which are rotationally connected to allow rotational movement between each section as discussed with respect to FIG. 7 below.

As shown in a first view 30, the exemplary flex boot of the present invention may initially be substantially laterally aligned with the joined span pipes (i.e. net angle between pipes of 0 degrees). As illustrated, when the span joint is straight (which is not its normal state due to span crown) the distance between the pipe ends is 7". As shown in a second view 32, the exemplary flex boot may flex rearward to allow for a net rearward angle between the span pipes of anywhere between 0-180 degrees. In the specific example shown, when the exemplary spans undergo a 30% (16.7 degrees) slope absorption, the rearward/bottom of the pipe faces are shown moving to become 9.76" apart with the boot of the present invention elongating from 7" to 9.76" (or 39%) to accommodate this movement. As shown in a third view 34, the exemplary flex boot may further flex forward to allow for a net forward angle between span pipes of anywhere between 0-180 degrees.

Figure 5:
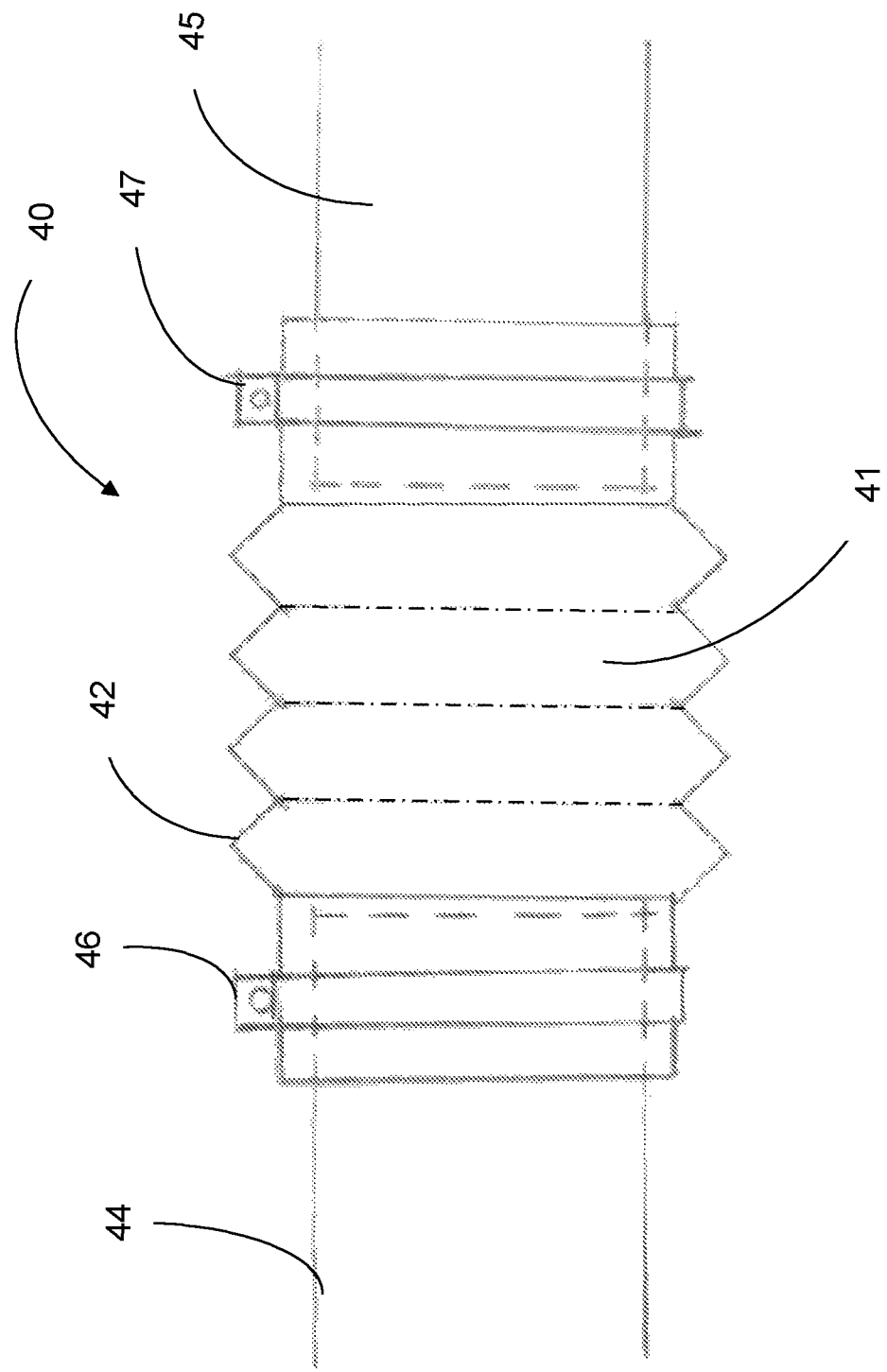
FIG. 5 shows an exemplary flex boot in accordance with an alternative embodiment of the present invention.

With reference now to FIG. 5, an exemplary flex boot 40 in accordance with an alternative embodiment of the present invention shall now be discussed. As shown, an exemplary flex boot 40 may include a center body portion 41 which extends around and secures a pair of pipe sections 44, 45 via securing straps/clamps 46, 47. Further, the exemplary flex boot 40 may preferably further include one or more bellows 42 which extend around the center body portion 41. As further shown, the bellows 42 in accordance with an alternative preferred embodiment may be formed in a variety of shapes including pyramid, triangular or other angular shapes.

Figure 6A:
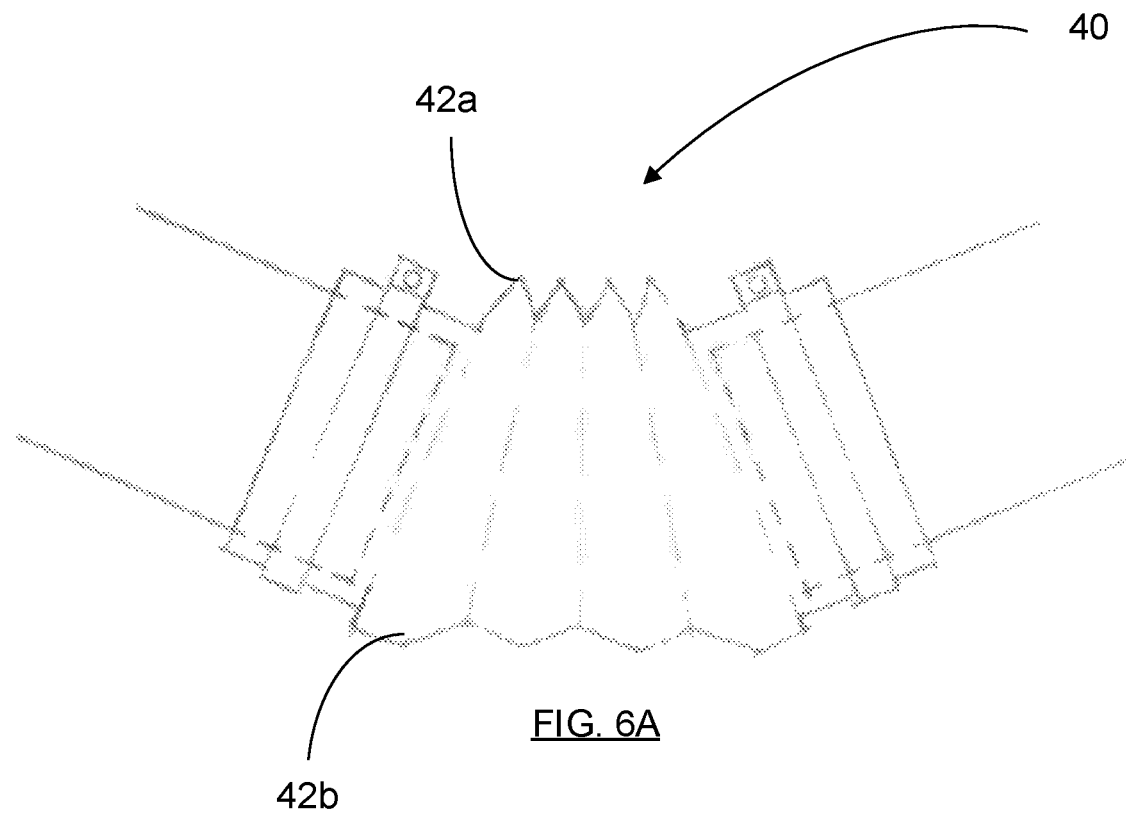
FIG. 6A shows an overhead view of the exemplary flex boot of FIG. 5 with the forward bellow ridges compressed and the rear bellow ridges flexed.
Figure 6B:
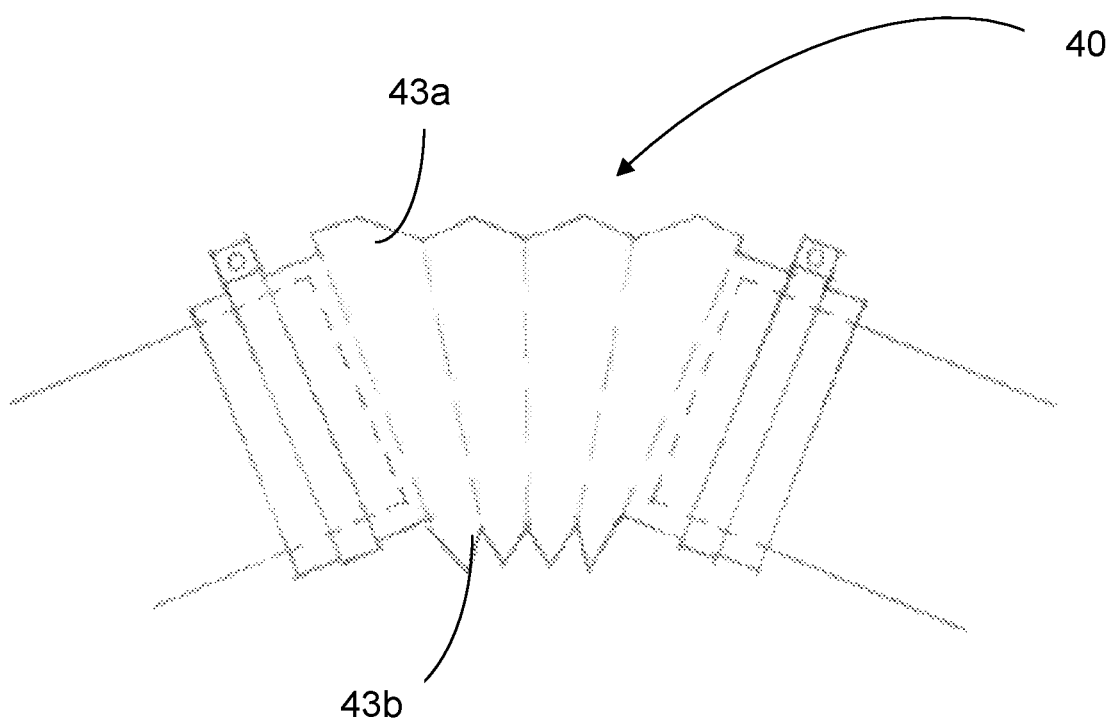
FIG. 6B shows an overhead view of the exemplary flex boot of FIG. 5 with the forward bellow ridges extended and the rear bellow ridges compressed.

With reference now to FIGS. 6A and 6B, flexed views of the exemplary preferred embodiment of FIG. 5 are shown. As shown in FIG. 6A, the exemplary flex boot 40 of FIG. 5 is shown with the forward bellow ridges 42a compressed and the rear bellow ridges 42b extended. In FIG. 6B, the same exemplary flex boot 40 of FIG. 5 is shown with the forward bellow ridges 43a extended and the rear bellow ridges 43b compressed.

Figure 7:
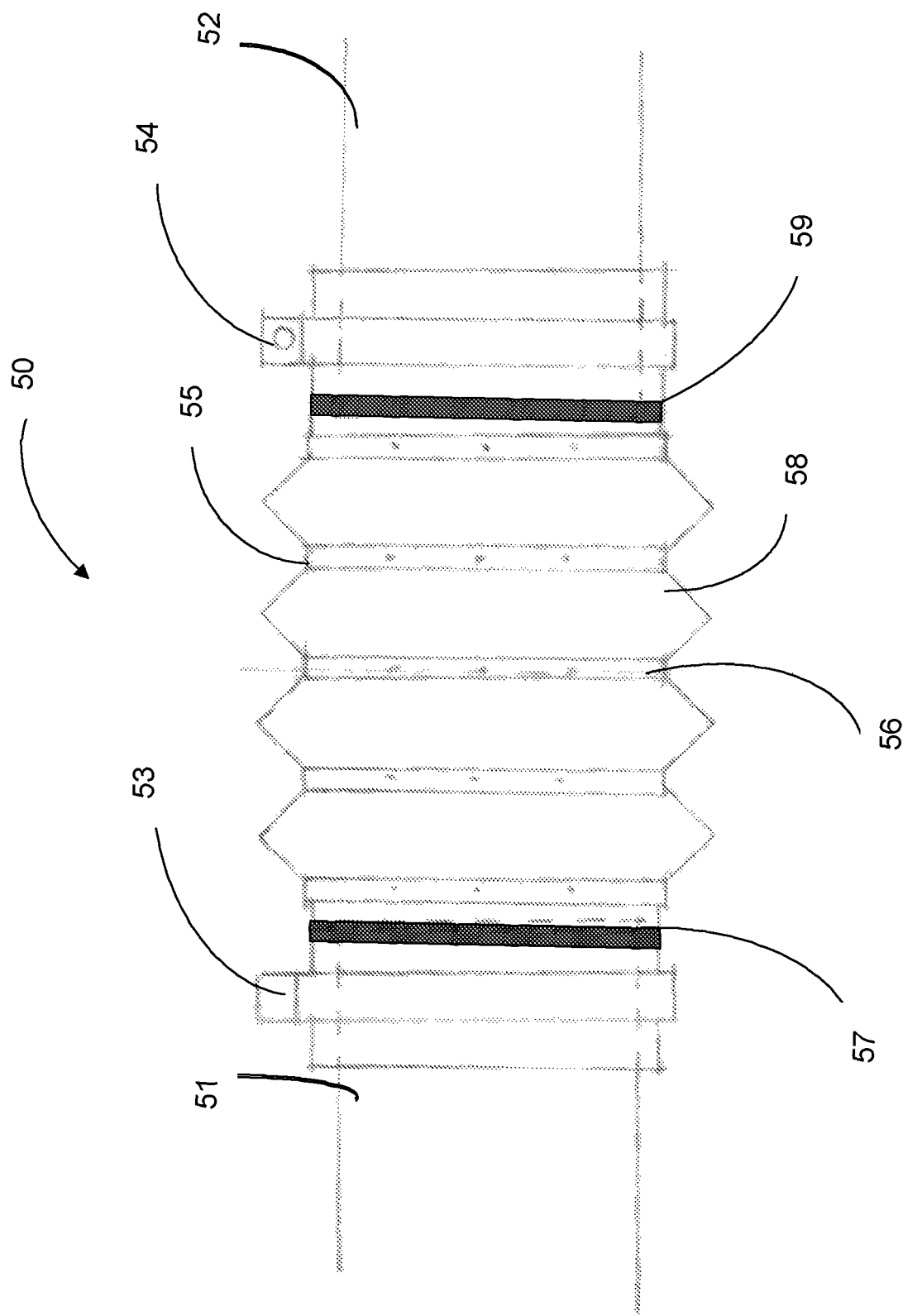
FIG. 7 shows an exemplary flex boot in accordance with a further alternative embodiment of the present invention.
Figure 8:
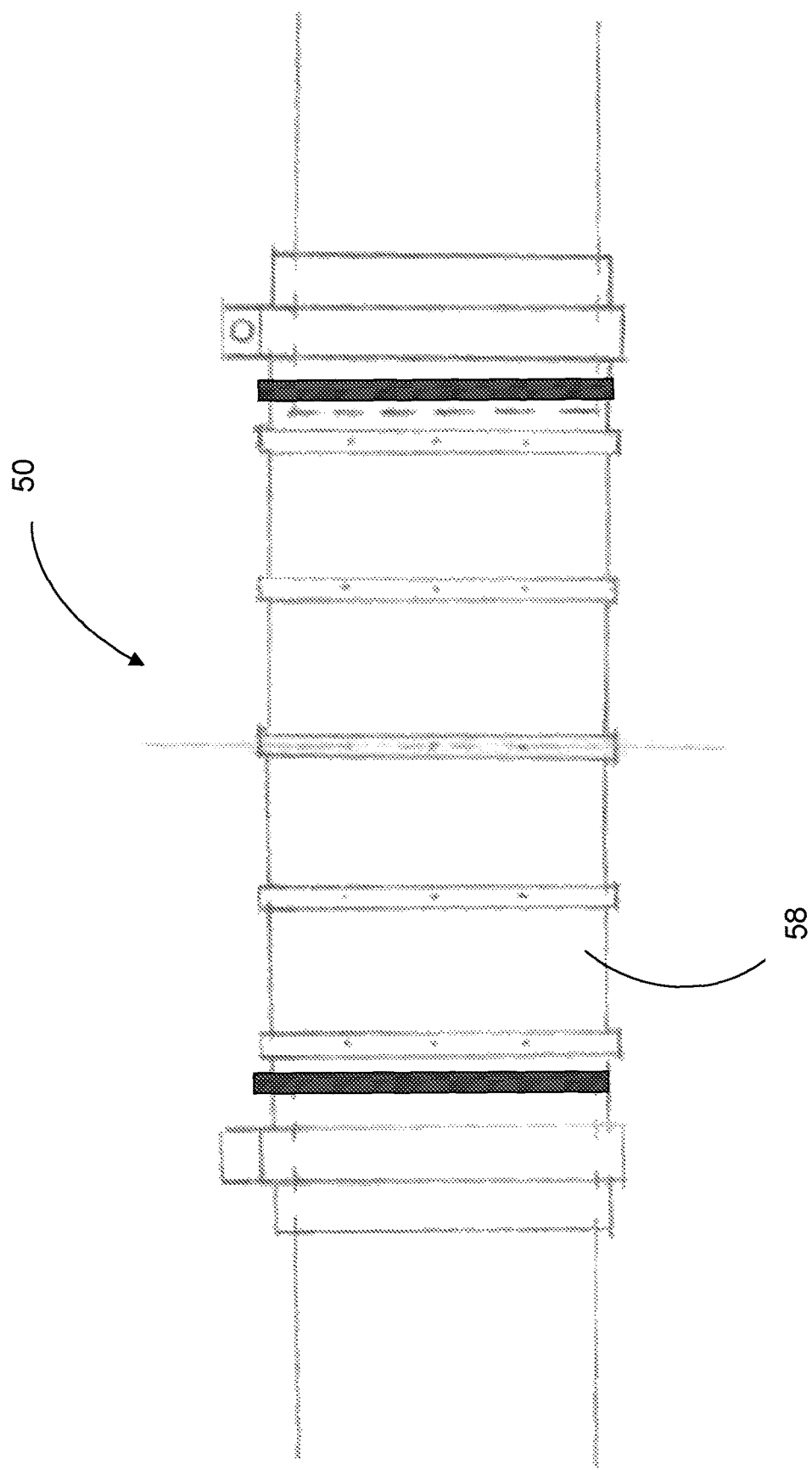
FIG. 8 shows the exemplary flex boot of FIG. 7 while being laterally extended.

With reference now to FIG. 7, a further alternative preferred embodiment of a flex boot 50 in accordance with a further alternative embodiment of the present invention shall now be discussed. As shown, an exemplary flex boot 50 may include a center body portion 55 which extends around and secures a pair of pipe sections 51, 52 via securing straps/clamps 53, 54. As further shown, the exemplary flex boot 50 may preferably further include one or more bellows 58 which extend around the center body portion 55. As further shown, the flex boot 50 may further include reinforcement bands 56 which may be formed of a metal, plastic or fabric strips or bands secured into the valleys between each bellow 58. FIG. 8 shows the exemplary flex boot 50 of FIG. 7 with each bellow 58 laterally extended as discussed with respect to FIGS. 2 and 3 above.

With further reference to FIG. 7, the exemplary flex boot 50 of the present invention may further include a plurality of rotational bearings 57, 59 which preferably rotate in response to any transferred rotation movement of the attached span pipes 51, 52. Accordingly, where span pipe 51 rotates (spins forward or backwards) about its axis, rotational bearing 57 preferably may internally rotates as needed to minimize the transfer of rotational forces into main body 55 of the flex boot 50. Likewise, where span pipe 52 rotates (spins forward or backwards) around its axis, rotational bearing 59 preferably internally rotates as needed to minimize the transfer of rotational force into the main body 55 of the flex boot 50. According to a preferred embodiment, the rotational bearings 57, 59 preferably may be of any form to allow independent rotation between the span pipes and the main body 55 of the flex boot 50. For example, these may include: slewing bearings, composite bearings, ball bearings, roller bearings or any other type of bearing or rotational mechanism.

While the above descriptions regarding the present invention contain much specificity, these should not be construed as limitations on the scope, but rather as examples. Many other variations are possible. Accordingly, the scope of the present invention should be determined not by the embodiments illustrated, but by the appended claims and their legal equivalents.

What is claimed is:

1. An irrigation boot assembly for securing a first span pipe to a second span pipe each having a first diameter, wherein the irrigation boot assembly comprises:
    a center body portion, wherein the center body portion comprises a laterally extending, hollow tube having a first side opening and a second side opening; further wherein the center body portion has a second diameter which is larger than the first diameter; wherein the center body portion is configured to receive the first span pipe within the first side opening; further wherein the center body portion is configured to receive the second span pipe within the second side opening;
    a first securing strap and a second securing strap; wherein the first securing strap extends around the first side opening and the first span pipe; further wherein the second securing strap extends around the second side opening and the second span pipe;
    a plurality of bellows; wherein the bellows are incorporated into the walls of the center body portion to form concertinaed sides; wherein each bellow is comprised of a ridge portion extending above the surface of the center body portion; further wherein the bellows are formed to compress and extend in response to lateral and angular forces applied due to the misalignment of the first and second span pipes;
    wherein the center body portion further comprises a plurality of valleys which are positioned between each of the plurality of bellows; and
    a plurality of reinforcing bands; wherein at least one reinforcing band extends around the center body portion; wherein at least one reinforcing band is comprised of metal, plastic or fabric secured within a valley;
    wherein the bellows are configured to compress down to a compressed length and extend to an extended length;
    wherein the extended length is more than two inches longer than the compressed length;
    wherein the irrigation boot assembly further comprises a first rotational bearing connected to the first span pipe and a second rotational bearing connected to the second span pipe;
    wherein the first and second rotational bearings are configured to rotate in response to any transferred rotational movement from the first and second span pipes.

2. The irrigation boot assembly of claim 1, wherein the bellows are comprised of semicircular ridges.

3. The irrigation boot assembly of claim 2, wherein the semicircular ridges have an outer circumference greater than 2 inches.

4. The irrigation boot assembly of claim 1, wherein the bellows extend to a length greater than nine inches.

5. The irrigation boot assembly of claim 4, wherein the bellows compress to less than 3 inches.

6. The irrigation boot assembly of claim 5, wherein the outer circumference of each bellow is within the range of 0.5-5.0 inches.

7. The irrigation boot assembly of claim 1, wherein the bellows are V-shaped.

8. The irrigation boot assembly of claim 1, wherein the bellows are circular shaped.

9. The irrigation boot assembly of claim 5, wherein the irrigation boot assembly is configured to flex rearward to create a net rearward angle between the first span pipe and the second span pipe in the range of 10-100 degrees.

10. The irrigation boot assembly of claim 5, wherein the irrigation boot assembly is configured to flex forward to create a net forward angle between the first and second span pipes in the range of 10-100 degrees.

11. The irrigation boot assembly of claim 1, wherein the bellows are pyramid shaped.

12. The irrigation boot assembly of claim 1, wherein the bellows are triangular shaped.

13. An irrigation boot assembly for securing a first span pipe to a second span pipe each having a first diameter, wherein the irrigation boot assembly comprises:
    a center body portion, wherein the center body portion comprises a laterally extending, hollow tube having a first side opening and a second side opening; further wherein the center body portion has a second diameter which is larger than the first diameter; wherein the center body portion is configured to receive the first span pipe within the first side opening; further wherein the center body portion is configured to receive the second span pipe within the second side opening;
    a first securing strap and a second securing strap; wherein the first securing strap extends around the first side opening and the first span pipe; further wherein the second securing strap extends around the second side opening and the second span pipe;
    a plurality of bellows; wherein the bellows are incorporated into the walls of the center body portion to form concertinaed sides; wherein each bellow is comprised of a ridge portion extending above the surface of the center body portion; further wherein the bellows are formed to compress and extend in response to lateral and angular forces applied due to the misalignment of the first and second span pipes;
    wherein the center body portion further comprises a plurality of valleys which are positioned between each of the plurality of bellows; and
    a plurality of reinforcing bands; wherein at least one reinforcing band extends around the center body portion; wherein at least one reinforcing band is comprised of metal, plastic or fabric secured within a valley;
    wherein the irrigation boot assembly is comprised of four bellows formed within the center body portion;
    wherein the bellows are configured to compress down to a compressed length and extend to an extended length;
    wherein the extended length is more than two inches longer than the compressed length; wherein the bellows extend to a length greater than nine inches; wherein the bellows compress to less than 3 inches; wherein the irrigation boot assembly further comprises a first rotational bearing connected to the first span pipe and a second rotational bearing connected to the second span pipe.

14. The irrigation boot assembly of claim 13, wherein the first and second rotational bearings are configured to rotate in response to any transferred rotational movement from the first and second span pipes.

* * * * *